W. P. SUTPHIN.
CULTIVATOR.
APPLICATION FILED DEC. 3, 1912.
1,128,197.
Patented Feb. 9, 1915.
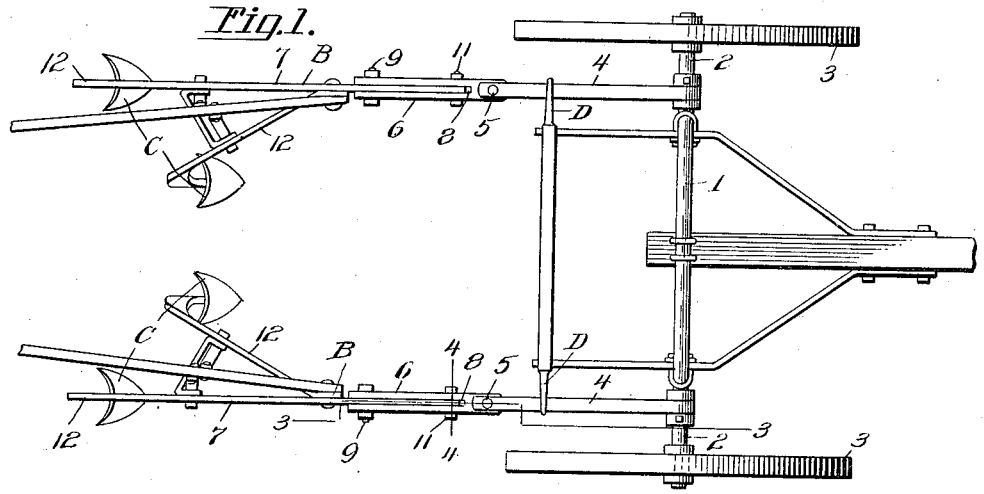
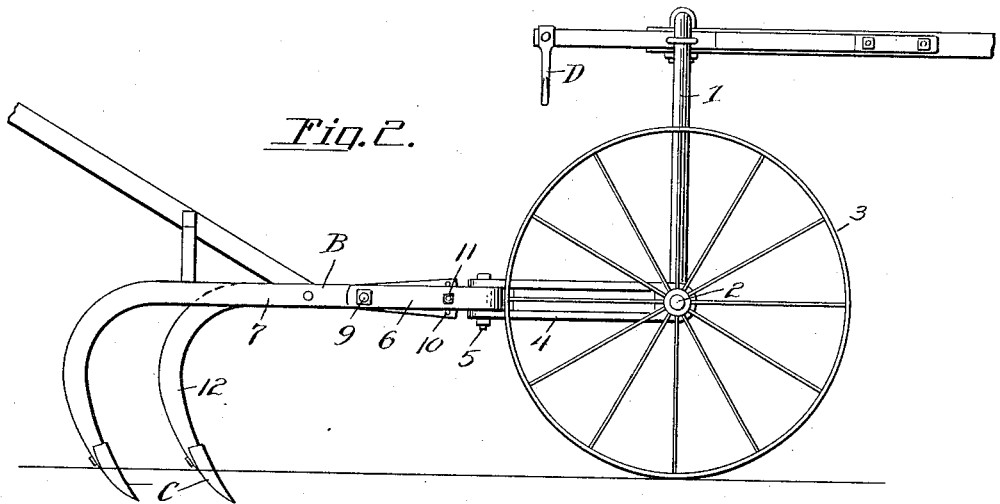
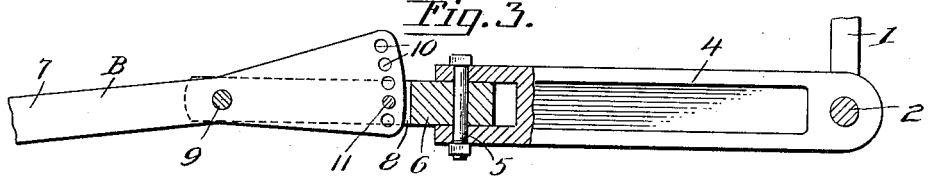
Witnesses
F. C. Gibson.
Inventor
William P. Sutphin.
By Victor J. Evans
Attorney

UNITED STATES PATENT OFFICE.

WILLIAM P. SUTPHIN, OF THE PLAINS, VIRGINIA.

CULTIVATOR.

1,128,197. Specification of Letters Patent. Patented Feb. 9, 1915.

Application filed December 3, 1912. Serial No. 734,739.

*To all whom it may concern:*

Be it known that I, WILLIAM P. SUTPHIN, a citizen of the United States, residing at The Plains, in the county of Fauquier and State of Virginia, have invented new and useful Improvements in Cultivators, of which the following is a specification.

This invention relates to cultivators, and it has particular reference to a walking cultivator adapted to be used on hillsides and in rough country where rocks, stumps and other obstructions abound.

The principal objects of the invention is to produce a simple and efficient walking cultivator which shall be so constructed that the rearward portions of the beams shall be capable of moving freely, laterally, in an approximately horizontal plane, and in such a manner as to avoid contact with the rims of the wheels, thereby enabling the cultivator plows or gangs to be freely manipulated in such a manner as to avoid any obstructions in the path thereof.

A further object of the invention is to construct the cultivator beams with joints whereby they may be adjusted to present the plows at various angles to the ground, thereby enabling the plows or shovels to be quickly adjusted to compensate for wear and thus rendering the plows or shovels more effective and greatly increasing the life thereof.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—Figure 1 is a top plan view of a cultivator constructed in accordance with the invention. Fig. 2 is a detail view in side elevation of one of the cultivator beams, showing also the cultivator axle and a portion of one of the wheels. Fig. 3 is a sectional detail view taken on the line line 3—3 in Fig. 1, and showing a different adjustment than that appearing in Fig. 2. Fig. 4 is a transverse sectional detail view taken on the line 4—4 in Fig. 1.

Corresponding parts in the several figures are denoted by like characters of reference.

The improved cultivator comprises the customary arched axle 1 having spindles 2 on which the wheels 3 are mounted for rotation. Supported on the spindles, between the wheels and the axle arch, are the rearwardly extending forked arms 4 which are adapted to rock on the spindles and in the forks of which the forward ends of the cultivator beams are pivotally mounted on pins or bolts 5 for lateral swinging movement in an approximately horizontal plane. The pins or bolts 5 on which the beams are mounted are located to the rearward of the circumference of the wheels 3, thus permitting the beams to be swung laterally even to such an extent as to lie at an angle of approximately 90 degrees to the arms 4, without touching or interfering with the wheels of the cultivator. By this construction the trouble of the cultivator beams interfering with the wheels is completely overcome, and the operator is enabled to swing the beams clear of rocks, stumps and other obstructions without danger of breaking or injuring either the beams or the wheels. The beams, which are designated by B, are each composed of front and rear members 6 and 7. The front members 6 which are pivoted on the pins or bolts 5 are each provided with a vertical recess 8 for the accommodation of the forward end of the rear member 7 which is mounted pivotally on a pin 9, said rear member being also provided at its front end with a plurality of apertures 10 for the passage of an adjusting pin 11 which extends transversely through the front member 6. The rear member 7 is thus adjustable in an approximately vertical plane, and it may be held securely at various adjustments by means of the pin 11 engaging one or another of the apertures 10.

The rear members 7 of the beams may be provided each with one or more plow carrying standards 12; in the drawing each beam has been shown as provided with two standards on which the plow blades or shovels C are mounted in the customary manner. These blades or shovels are made of the customary longitudinally curved or arcuate shape, and these blades or shovels are mounted on the standards, the angles of which by proper adjustment of the rear members with respect to the front members of the beams may be varied so as to cause the shovels to engage or take the ground in the most advantageous manner, the adjustment of the rear with respect to the front members of the beams being effected by proper adjustment of the pin 11. By such adjustment the operation of the machine will be facilitated and rendered easy and natural to the operator whose attention will not be diverted from his work by the necessity of forcibly holding the plows in the ground. As the blades become worn, readjustment may be made by shifting the adjusting pin 11 to the aperture 10 next below; the standards at the rear ends of the plow beams will thus be thrown downward and forward, thereby restoring the relative condition of the plow blade or shovel with respect to the ground. It will be observed that this adjustment is altogether independent of the rocking movement of the forward member of the beam on the spindle of the axle; the last mentioned rocking movement enables the plows to be lifted from or restored to engagement with the ground in the customary manner, and the plows when the machine is not in operation, or while it is being turned at the end of a row, may be supported on hooks D provided for the purpose; the independent adjustment of the rear members with respect to the front members of the beams in an approximately vertical plane is entirely for the purpose of compensating for wear on the plow blades or shovels, and to cause the latter to enter or engage the ground at the proper and most efficient angle at all times and at all adjustments.

It will be particularly noted that the pins or pivot members 5 whereby the cultivator beams B are connected with the arms 4 are positioned in rear of the perimeters of the wheels, thus permitting said beams, which are entirely independent of each other, to be swung independently to either side, and that when thus swung in an outward direction the said beams may be moved to a position if desired at right angles to the arms 4, thereby permitting any obstructions to be avoided. Inasmuch as this device is particularly intended for use on hillsides and on ground that is rough and uneven, owing to the presence of rocks and stumps, this construction is of particular importance, and it may be stated that for the use for which it is intended this improved cultivating device has proved in practice to be peculiarly effective.

Having thus described the invention, what is claimed as new, is:—

In a cultivator, an arched axle having wheel carrying spindles, bifurcated arms mounted on the spindles for rocking movement vertically, and beams connected with the bifurcated arms for rocking movement laterally and independently of each other, the points of connection being located to the rearward of the circumference of the wheels; each beam being composed of a forward member and a rearward member pivotally connected therewith for rocking movement in a vertical plane, means being provided whereby the rear members may be held securely at various adjustments with respect to the front members, and said rear members being provided with plow carrying standards.

In testimony whereof I affix my signature in presence of two witnesses.

WILLIAM P. SUTPHIN.

Witnesses:
E. EDMONSTON, Jr.,
WM. BAGGER.

Copies of this patent may be obtained for five cents each, by addressing the "Commissioner of Patents, Washington, D. C."